Aug. 1, 1961 A. SEPE ET AL 2,994,448

SELF FEEDING BABY BOTTLE HOLDER AND THERMO INSULATOR

Filed Oct. 1, 1959 3 Sheets-Sheet 1

INVENTORS.
ANTHONY SEPE
LOUIS J. SEPE
BY
Zoltan H. Polachek
ATTORNEY

SELF FEEDING BABY BOTTLE HOLDER AND THERMO INSULATOR
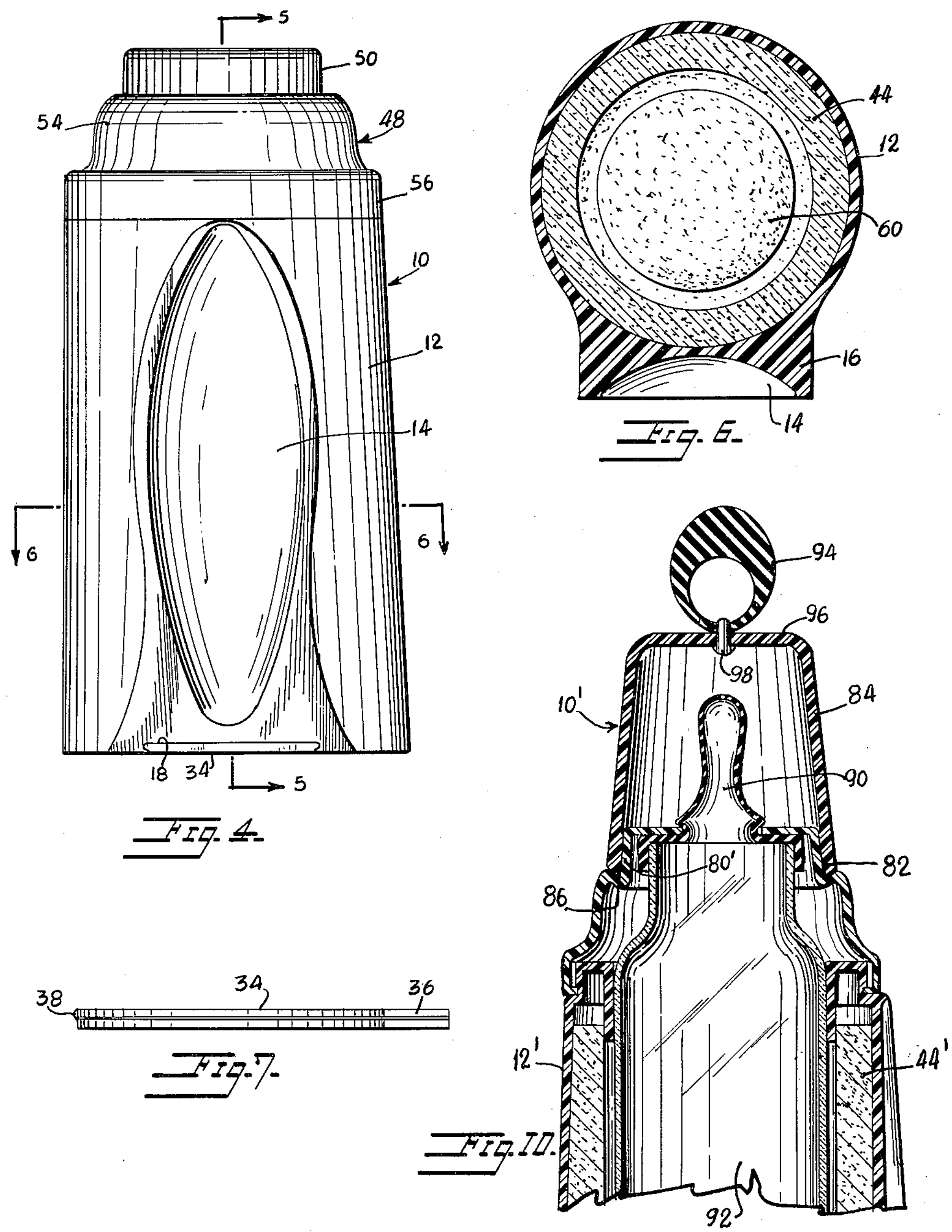
INVENTORS
ANTHONY SEPE
LOUIS J. SEPE
BY [signature]
ATTORNEY

SELF FEEDING BABY BOTTLE HOLDER AND THERMO INSULATOR

Filed Oct. 1, 1959 3 Sheets-Sheet 3

INVENTORS
ANTHONY SEPE
LOUIS J. SEPE
BY
Zoltan H. Polachek
ATTORNEY

United States Patent Office 2,994,448

Patented Aug. 1, 1961

2,994,448

SELF FEEDING BABY BOTTLE HOLDER AND THERMO INSULATOR

Anthony Sepe and Louis J. Sepe, both of 2403 Hubbard St., Brooklyn, N.Y.

Filed Oct. 1, 1959, Ser. No. 843,889
2 Claims. (Cl. 215—1)

This invention relates to the art of containers and more particularly to a container for holding a baby's nursing bottle with the liquid therein in warm condition.

A principal object of the present invention is to provide a container with a temperature insulated lining therein, shaped to accommodate a baby's nursing bottle.

Another object of the invention is to provide a container of this type with a removable neck portion adapted to fit over and to engage and press the cap and nipple assembly of a nursing bottle so as to hold the bottle therein.

A further object is to provide a container of this type with means for storing a spare nipple for a baby's nursing bottle.

It is also proposed to provide a container of this type with a removable neck portion serving as means for mounting a cap and toy assembly adapted to serve as a teether for an infant and as an amusing and diverting whistle toy.

It is also an object of the invention to provide a container of this type with means for supporting the container in a horizontally disposed position so as to provide a self-feeding container.

Still another object is to provide a container of this type wherein the outer surface of the container is decorated to carry out a carnival motif.

It is a further object of the invention to provide a container of this type that is sanitary, simple in construction and that can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 4 is a side elevational view of the container of FIG. 1, looking from the right of FIG. 1.

FIG. 6 is a cross-sectional view taken on the plane of the line 6—6 of FIG. 4.

FIG. 7 is an edge view of the bottom closure plate.

FIG. 10 is a view similar to FIG. 5 of a fragment of a container embodying a modification of the invention.

Figure 1:
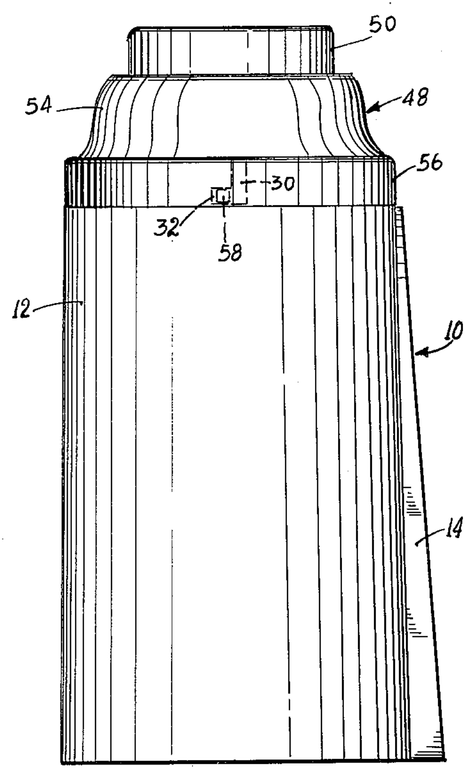
FIG. 1 is a front elevational view of a container embodying the invention.

Referring in detail to the drawings, in FIG. 1 a container made in accordance with the invention is shown and indicated generally by the reference numeral 10. The container 10 comprises a hollow cylindrical outer body or jacket 12, open at both ends and tapering inwardly from the bottom to the top thereof in the manner of a truncated cone. The body is formed of suitable plastic material, such as polystyrene, polyethylene, vinyl copolymer or the like, which is moisture-proof, chemically inert to food and body acids and soft and flexible to the touch. An oval-shaped enlargement 14 is formed on the outer surface of the body and extends from top to bottom thereof. At its bottom end, the enlargement flares outwardly as indicated at 16 and is formed with an undercut dovetail groove 18 along its bottom edge. The outer face of the enlargement is flat and plane to provide a smooth bearing surface for supporting the container in a horizontally disposed position for optimum self-feeding.

At the top end, the body is reduced in diameter as indicated at 20 forming a shoulder 22 and with a horizontally disposed inwardly extending flange 24 terminating in a downwardly and inwardly extending annular flange 26 disposed parallel with the wall of the body but spaced therefrom to provide an annular space 28 therebetween. On opposite sides, the reduced portion 20 is formed with downwardly extending grooves 30 intersecting the top edge of the reduced portion and terminating at the bottom end thereof in laterally extending grooves or slots 32 in the manner of a bayonet slot.

The bottom opening in the body 12 is closed by a substantially circular closure plate 34, said plate being formed with an extension 36 adapted to fit in the undercut dovetail groove 18 in the bottom of the enlargement 14. The closure plate is held in closing position by an annular bead 38 thereon interlocking with an inner annular groove 40 formed on the bottom end of the outer body 12 and by the edges of the extension 36 interlocking with the edge walls of the dovetail groove 18.

The body 12 is provided with a lining 44 on its inner surface, which lining extends up into the recess 28 and over and across the bottom closure plate 34, as indicated at 46. The lining is much thicker than the body 12 and is composed of a thermal insulation material, such as polystyrene plastic foam insulation expanded about forty times.

An inverted dish-shaped cap unit 48 is removably mounted on the reduced top portion 20 of the body 12 for closing the top end of the body. The cap unit is formed of the same material as the body 12 and comprises a flanged base portion 50 with a central opening 52 therein and an outwardly flaring downwardly extending skirt portion 54 terminating in a circular depending flange 56. On the inner surface of the flange 56, at opposite sides thereof, inwardly extending circular lugs or buttons 58 extend inwardly thereof. The lugs or buttons 58 are adapted to ride in the vertical grooves 30 and lateral slots 32 in the reduced portion of the top end of the body 12 for interlocking the cap to the body 12.

The invention also contemplates the provision of means for storing a spare nipple for a nursing bottle. For this purpose, an inverted box-shaped or dish-shaped member 60 is removably mounted on the bottom portion 46 of the lining 44 of the body 12. The member 60 is formed of resilient sponge material or the like. A spare nipple 62 may be placed on the bottom portion and the member 60 placed thereover as shown in FIG. 5.

Figure 5:
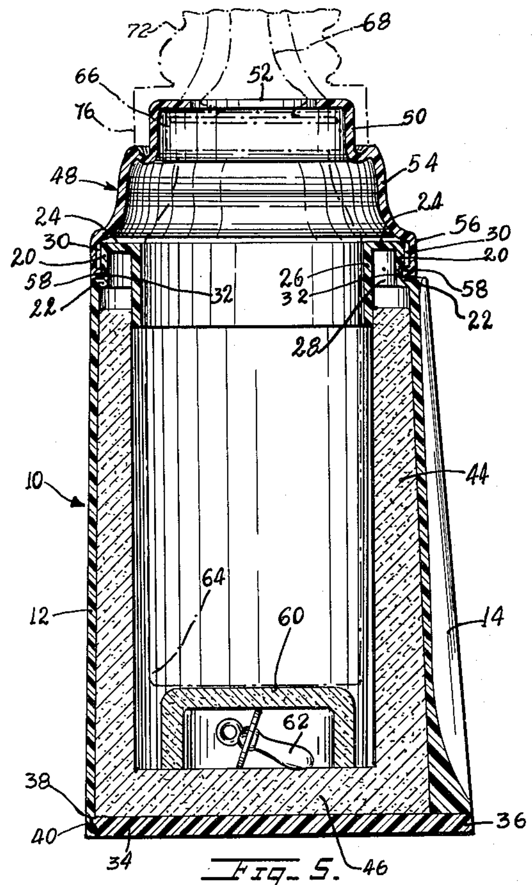
FIG. 5 is a vertical sectional view of the container taken on the plane of the line 5—5 of FIG. 4, showing a spare nipple in storage.
Figure 2:
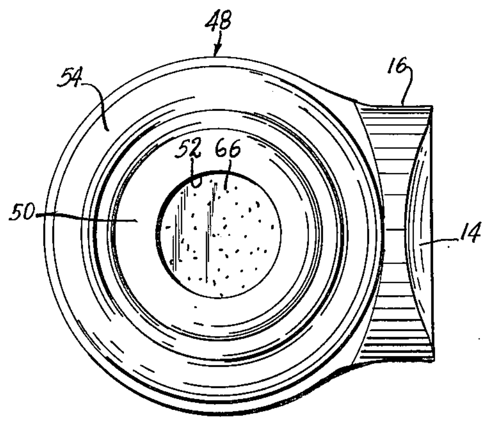
FIG. 2 is a top plan view of the container of FIG. 1.
Figure 3:
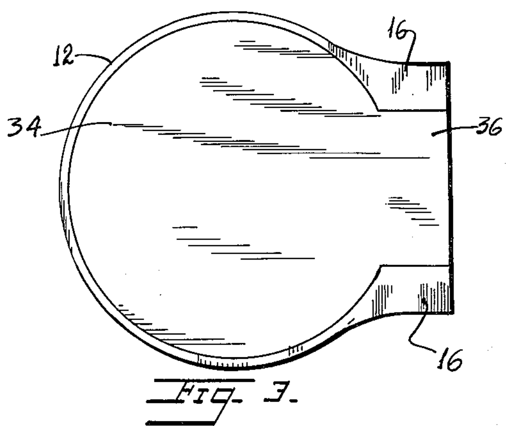
FIG. 3 is a bottom plan view thereof.

In using the container 10, for holding a nursing bottle with milk therein in warm condition, the cap unit 48 is removed from the body 12 and a nursing bottle such as the bottle 64 with flanged cap 66 and supported nipple 68 shown in FIG. 5 is inserted into the body 12 with its bottom end supported on the resilient member 60. The flange 26 guides the bottle to its seat on member 60. The cap unit is then restored, the opening 52 in the flanged base 50 of the cap unit being slipped over the nipple of the bottle and the cap unit forced downwardly with its flanged base engaging the flanged cap 66 of the nursing nipple 64 during the restoring operation for yieldingly moving the bottle inwardly, the resiliency of the material of the member 60 permitting this operation.

Figure 9:
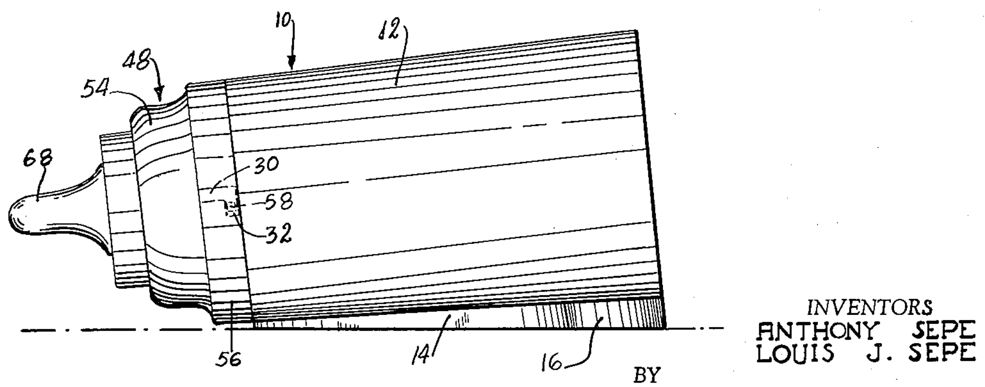
FIG. 9 is a side elevational view showing the container of FIG. 8 disposed horizontally in a preferred self-feeding position, the cap and toy assembly being removed.

In FIG. 9, the container 10 is shown turned over onto its side in a horizontally disposed position resting on the flat face of the enlargement 14. In this position, the nipple 68 of the nursing bottle is horizontally disposed in a position close to the supporting surface and close enough for the infant to grasp with its mouth for feeding.

Figure 8:
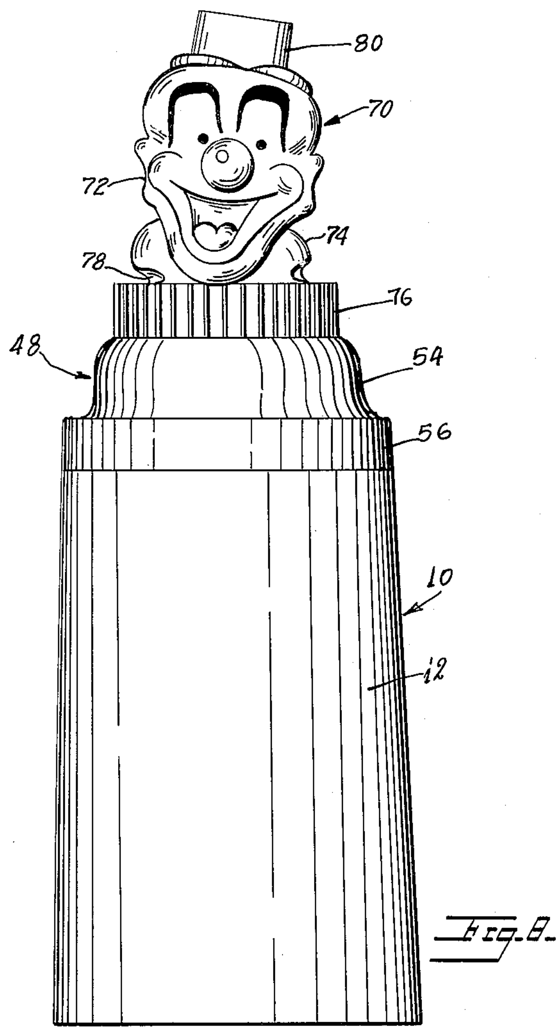
FIG. 8 is a view similar to FIG. 1 but showing a cap and toy assembly in position on the container.

Referring now to FIGS. 5 and 8, the invention contemplates the use of a cap and toy assembly indicated generally at 70 removably supported on the flanged base 50 of the cap unit 48. This cap and toy assembly 70 is formed of rubber and comprises a hollow body portion 72 in the form of a head of a clown, with neck portion 74 and a downwardly extending annular flange portion 76 formed with a roughened periphery. The neck portion is provided with an opening 78. The head is topped with a hat 80, having a narrow crown. The cap and toy assembly is applied to the top of the body 12 with the cap and nipple on the bottle, by slipping the flange portion 76 downwardly over the periphery of the flanged base portion 50 of the cap unit 48. The nipple 68, however, may be inverted in the cap 66 if desired. When the cap and toy unit is mounted on the body 12 of the container, it serves to amuse the child and also serves as a teether, the infant being able to bite into the material of the head and hat thereof. When the infant squeezes the head 72 the rush of air through the opening 78 produces a whistle sound. It is contemplated that containers 10 with decorated outer surfaces will be used with the cap and toy assemblies in order to make the containers more amusing and interesting to children.

An insulated container is thus provided that embodies in one structure, a milk warmer, a nipple feeder, a toy, bottle holder, teether, and whistle. The container is economically manufactured by conventional molding processes from low cost plastic, rubber and insulation material. The several parts are easily cleaned and kept sanitary. The parts are durable and long lasting and individually replaceable at low cost if lost.

Referring now to the modification shown in FIG. 10, the container 10' comprises a hollow cylindrical outer body or jacket 12' tapering inwardly from bottom to top. The body 12' is formed of the same plastic material as the body 12 of the form shown in FIGS. 1 to 9, inclusive. At the top end, the body is reduced in diameter forming a neck portion 80' and between the neck portion and body there is an annular groove 82 around the neck portion. The body 12' is provided with a lining 44' similar to lining 44 of the form of FIGS. 1 to 9, inclusive. A plastic cover 84 of inverted cup-shape is formed with a reduced edge portion 86 for seating in the groove 82 and on the shoulder of the body for sealing the joint between the cover and body. The cover is sufficiently long to fit over an upstanding nipple 90 slipped over the neck of a nursing bottle 92 in order to protect the nipple.

An annular plastic teething ring 94 is rotatably secured to the base 96 of the cover by means of a pivot pin 98 extending through the base.

While we have illustrated and described the preferred embodiments of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. An insulated container for a nursing bottle comprising a plastic hollow cylindrical body closed at the bottom and open at the top, the open top end being reduced in diameter and having an inwardly extending flange parallel to the wall of the body and spaced therefrom, insulating material lining the inner surface of the wall of the body and the bottom of the body and extending into the space between the flange and wall of the body, and a removable cap unit closing the top opening in the body, said cap unit having a flanged base portion, a flaring skirt portion terminating in a flange portion, interlocking means on the reduced portion of the body and the flange of the cap unit for interlocking the cap unit on the body, said flanged base portion adapted to engage the cap of a nursing bottle supported in the body, said flanged base portion having a central opening to receive the nipple of a supported nursing bottle, and an inverted hollow imperforate dish-shaped member of sponge material removably supported on the insulating material on the bottom of the body for storing a nipple for a nursing bottle, said inwardly directed flange serving to guide a nursing bottle into the body, onto the dish-shaped member, said dish-shaped member adapted to serve as a spring support for a supported nursing bottle.

2. An insulated container for a nursing bottle comprising a plastic hollow cylindrical body closed at the bottom and open at the top, the open top end being reduced in diameter and having an inwardly extending flange parallel to the wall of the body and spaced therefrom, insulating material lining the inner surface of the wall of the body and the bottom of the body and extending into the space between the flange and wall of the body, and a removable cap unit closing the top opening in the body, said cap unit having a flanged base portion, a flaring skirt portion terminating in a flange portion, interlocking means on the reduced portion of the body and the flange of the cap unit for interlocking the cap unit on the body, said flanged base portion adapted to engage the cap of a nursing bottle supported in the body, said flanged base portion having a central opening to receive the nipple of a supported nursing bottle, and a cap and toy assembly removably mounted on the flanged base portion of the cap unit, said assembly including a hollow body in the form of the head of a clown, a neck portion and a flanged portion flaring outwardly and downwardly from said neck portion and slidable over the flanged base portion and a hat on the hollow body portion, said neck portion having an opening therethrough, the rush of air through said opening sounding like a whistle.

References Cited in the file of this patent

UNITED STATES PATENTS

| | | |
|---|---|---|
| 995,700 | Maynard | June 20, 1911 |
| 2,483,870 | Bailey | Oct. 4, 1949 |
| 2,484,631 | Maldonado | Oct. 11, 1949 |
| 2,704,903 | Laughlin | Mar. 29, 1955 |